(12) United States Patent
Low et al.

(10) Patent No.: US 11,491,856 B2
(45) Date of Patent: Nov. 8, 2022

(54) ADJUSTABLE TAILGATE PAD

(71) Applicant: Fox Factory, Inc., Duluth, GA (US)

(72) Inventors: Siupo Low, Vancouver (CA); Gary Schreiber, Surrey (CA); Vincent Huynh, Burnaby (CA)

(73) Assignee: Fox Factory, Inc., Duluth, GA (US)

( * ) Notice: Subject to any disclaimer, the term of this patent is extended or adjusted under 35 U.S.C. 154(b) by 162 days.

(21) Appl. No.: 16/851,002

(22) Filed: Apr. 16, 2020

(65) Prior Publication Data

US 2020/0331332 A1    Oct. 22, 2020

Related U.S. Application Data

(60) Provisional application No. 62/836,472, filed on Apr. 19, 2019.

(51) Int. Cl.
  *B60J 11/06*    (2006.01)
  *B62D 33/023*   (2006.01)
  *B60R 9/06*     (2006.01)
  *B62D 33/027*   (2006.01)

(52) U.S. Cl.
  CPC ........... *B60J 11/06* (2013.01); *B60R 9/06* (2013.01); *B62D 33/023* (2013.01); *B62D 33/0273* (2013.01)

(58) Field of Classification Search
  CPC .. B60R 9/06; B60R 9/10; B60R 13/01; G09F 21/048; B62D 33/023; B62D 33/0273; B62D 33/03; B60J 11/06
  USPC ........... 296/136.01, 136.02, 136.07, 136.11, 296/136.13, 39.2
  See application file for complete search history.

(56) References Cited

U.S. PATENT DOCUMENTS

| | | | | |
|---|---|---|---|---|
| 5,129,695 A | * | 7/1992 | Norman, II | B60J 11/06 293/128 |
| 5,255,464 A | * | 10/1993 | Marecek | G09F 21/048 40/591 |
| 5,799,975 A | * | 9/1998 | Crick | B25H 3/04 150/166 |
| 6,247,742 B1 | * | 6/2001 | Boudreaux | B62D 33/0273 296/57.1 |
| 6,254,170 B1 | * | 7/2001 | Farmer | B60J 11/06 150/166 |
| 6,286,885 B1 | * | 9/2001 | Ramos | B60R 13/01 296/64 |
| 6,484,427 B1 | * | 11/2002 | Santa Cruz | G09F 21/04 40/643 |
| 6,695,556 B2 | * | 2/2004 | Addy | B60R 9/00 410/97 |
| 6,749,250 B1 | * | 6/2004 | Reid | G09F 21/048 296/57.1 |
| 8,061,761 B1 | * | 11/2011 | Sierra | G09F 21/048 296/136.01 |
| 9,522,767 B1 | * | 12/2016 | Pass | G09F 21/04 |
| 9,701,225 B1 | * | 7/2017 | Hogan | A47C 4/52 |
| 10,300,861 B1 | | 5/2019 | Green et al. | |
| 10,343,617 B2 | | 7/2019 | Cox | |
| 10,377,215 B2 | | 8/2019 | Sierra | |
| 10,696,236 B1 | * | 6/2020 | Starkey | B60P 1/283 |

(Continued)

*Primary Examiner* — Gregory A Blankenship

(57) ABSTRACT

An adjustable tailgate pad. The adjustable tailgate pad includes a front side. The adjustable tailgate pad also includes a back side. The adjustable tailgate pad further includes an adjustable top side coupled to the front side and the back side. The adjustable top side has a width which is adjustable.

19 Claims, 10 Drawing Sheets

(56) References Cited

U.S. PATENT DOCUMENTS

| | | | |
|---|---|---|---|
| 10,857,950 B2 | 12/2020 | Cox | |
| 2002/0135202 A1* | 9/2002 | Rokahr | B62D 33/0273 |
| | | | 296/57.1 |
| 2003/0038497 A1* | 2/2003 | Fitzgerald | B60R 5/04 |
| | | | 296/39.1 |
| 2005/0275241 A1* | 12/2005 | Rothwell | B60R 11/00 |
| | | | 296/136.01 |
| 2008/0203752 A1* | 8/2008 | Warkentin | B62D 33/0273 |
| | | | 296/57.1 |
| 2013/0220185 A1* | 8/2013 | Valenta | B65D 65/10 |
| | | | 108/90 |
| 2017/0144614 A1* | 5/2017 | DePalma | B60R 13/013 |
| 2019/0337464 A1 | 11/2019 | Cox | |
| 2019/0344720 A1 | 11/2019 | Green et al. | |
| 2020/0215957 A1 | 7/2020 | Starkey | |
| 2020/0331332 A1* | 10/2020 | Low | B60R 9/10 |
| 2021/0107416 A1* | 4/2021 | Stien | B60R 13/01 |
| 2022/0001808 A1* | 1/2022 | Low | B60R 9/06 |

\* cited by examiner

ADJUSTABLE TAILGATE PAD

CROSS-REFERENCE TO RELATED APPLICATIONS (PROVISIONAL)

This application claims priority to and benefit of U.S. Provisional Patent Application No. 62/836,472 filed on Apr. 19, 2019, entitled "ADJUSTABLE TAILGATE PAD" by Low et al., and assigned to the assignee of the present application, the disclosure of which is hereby incorporated by reference in its entirety.

FIELD OF THE INVENTION

Embodiments of the present technology relate generally to a tailgate pad.

BACKGROUND

Many trucks and other vehicles include a tailgate. In some instances, owners of tailgate-equipped vehicles will utilize the tailgate when transporting, for example, a bicycle. For example, a truck owner will position a bicycle in the bed of the truck such that the front fork of the bicycle straddles the tailgate. In so doing, the front fork of the bicycle is located outside of the bed of the truck, while the rest of the bicycle is located inside of the bed of the truck. In such a position, the tailgate is disposed between the front fork and the rest of the bicycle frame, and, as a result, the tailgate supports the bicycle in an upright position. Hence, the tailgate can be used in lieu of, or in addition to, various bicycle carrier devices (e.g., bike racks). To prevent damage to the tailgate, and/or a bicycle straddling the tailgate, protective tailgate pads may be attached to the tailgate.

At present, there are significant variations in the structure and features of tailgates across various vehicle makers. Further, there are even significant variations in the structure and features of tailgates across vehicles from the same vehicle maker. As a result, in order to select an appropriate tailgate pad, a consumer is required to select a tailgate pad specifically designed to match the particular tailgate structure and the particular features of that consumer's vehicle.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

As stated above, in some instances, owners of tailgate-equipped vehicles may utilize the tailgate when transporting, for example, a bicycle. For purposes of brevity and clarity, the following discussion will refer to the tailgate of a truck. It should be understood, however, that the present embodiments are also well suited to use with a tailgate of a vehicle other than a truck. Moreover, embodiments of the present invention are well suited for use when transporting, for example, a motorcycle. Additionally, embodiments of the present adjustable tailgate pad 100 are well suited to use with other items such as, for example, a surfboard, a paddleboard, lumber or other items which may be transported in the bed of a truck. That said, for purposes of brevity and clarity, and not to be interpreted as a limitation, the following discussion will describe embodiments of the present invention while referring to a truck tailgate being used to support a bicycle.

Figure 1:
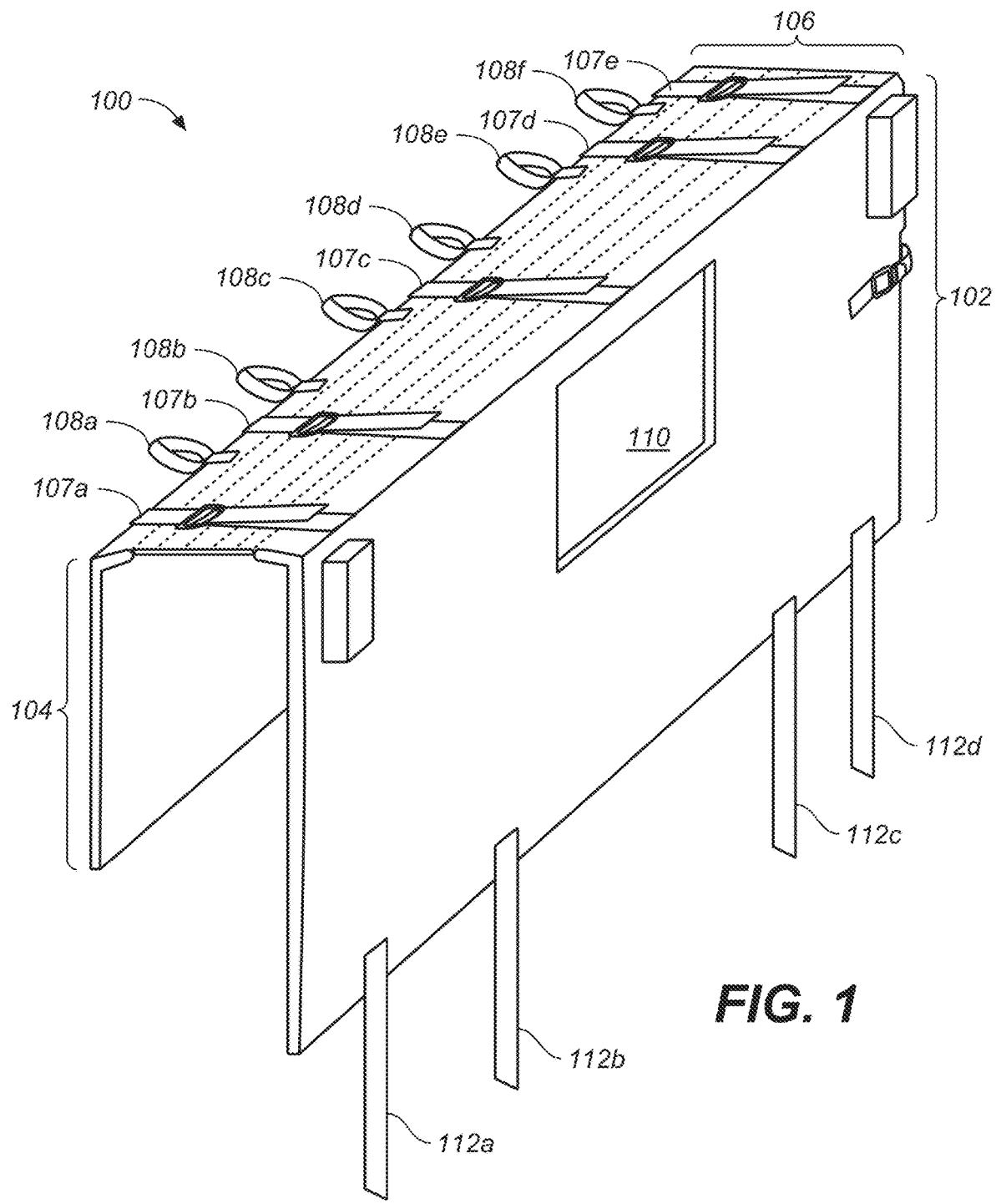
FIG. 1 is a perspective view of an adjustable tailgate pad, in accordance with embodiments of the present invention.

As will be described in detail below, embodiments of the present invention provide an adjustable tailgate pad. Referring now to FIG. 1, a perspective view of an adjustable tailgate pad 100 is shown, in accordance with embodiments of the present invention. Adjustable tailgate pad 100 of the present invention includes a front side 102, a back side 104 and a top side 106. It should be noted that each of front side 102, a back side 104 and a top side 106 are further comprised of a tailgate-facing surface and an exterior-facing surface. For purposes of brevity and clarity, and not to be interpreted as a limitation, the following discussion will describe embodiments of the present invention while generally referring to front side 102, a back side 104 and a top side 106. Occasionally, the following discussion will refer to a specific tailgate-facing surface and/or exterior-facing surface of front side 102, back side 104, and/or top side 106.

In embodiments of the present invention, top side 106 of adjustable tailgate pad 100 has a plurality of top side straps, typically shown as 107a-107e, coupled thereto. Although five top side straps 107a-107e are shown in the embodiment of FIG. 1, in some embodiments of the present invention, adjustable tailgate pad 100 will have more than five top side straps. Further, in some embodiments of the present invention, adjustable tailgate pad 100 will have less than five top side straps. Additionally, in some embodiments, the location and/or the spacing between the plurality of top side straps 107a-107e coupled to top side 106 will differ from the location and/or spacing of top side straps 107a-107e as depicted in FIG. 1. Top side straps 107a-107e of adjustable tailgate pad 100 will be discussed further below, in detail.

Referring still to FIG. 1, in embodiments of the present invention, adjustable tailgate pad 100 has a plurality of retaining straps, typically shown as 108a-108f, coupled thereto. In various embodiments of the present invention, retaining straps 108a-108f are used to strap a portion of a bicycle (e.g., a frame of a bicycle) against back surface 104 of adjustable tailgate pad 100. Although six retaining straps 108a-108f are shown in the embodiment of FIG. 1, in some embodiments of the present invention, adjustable tailgate pad 100 will have more than six retaining straps. Further, in some embodiments of the present invention, adjustable tailgate pad 100 will have less than six retaining straps. Additionally, in some embodiments, the location and/or the spacing between the plurality of retaining straps 108a-108f coupled to adjustable tailgate pad 100 will differ from the location and/or spacing of retaining straps 108a-108f as depicted in FIG. 1. Retaining straps 108a-108f of adjustable tailgate pad 100 will be discussed further below, in detail.

With reference still to FIG. 1, in various embodiments, adjustable tailgate pad 100 includes a window 110 formed in front side 102. In various embodiments of the present adjustable tailgate pad 100, as will be described in detail below, front side 102 has a window 110 formed therein. In various embodiments of the present invention, when window 110 of front side 102 is open, window 110 will expose, for example, a tailgate handle, a tailgate-mounted backup camera, or other tailgate features. In embodiments of the present invention, window 110 of adjustable tailgate pad 100 is rectangular in shape and approximately centered about the length of front side 102. Although such a location of window 110 is shown in the embodiment of FIG. 1, in some embodiments of the present invention, adjustable tailgate pad 100 will have window 110 disposed in front side 102 at a location other than as depicted in FIG. 1. Further, in some embodiments of the present invention, window 110 of adjustable tailgate pad 100 will have a non-rectangular shape. Window 110 of adjustable tailgate pad 100 will be discussed, in detail, further below. Further, as shown in FIG. 2 below, in some embodiments of the present invention, front surface 102 of adjustable tailgate pad 100 does not have a window formed therein.

Figure 2:
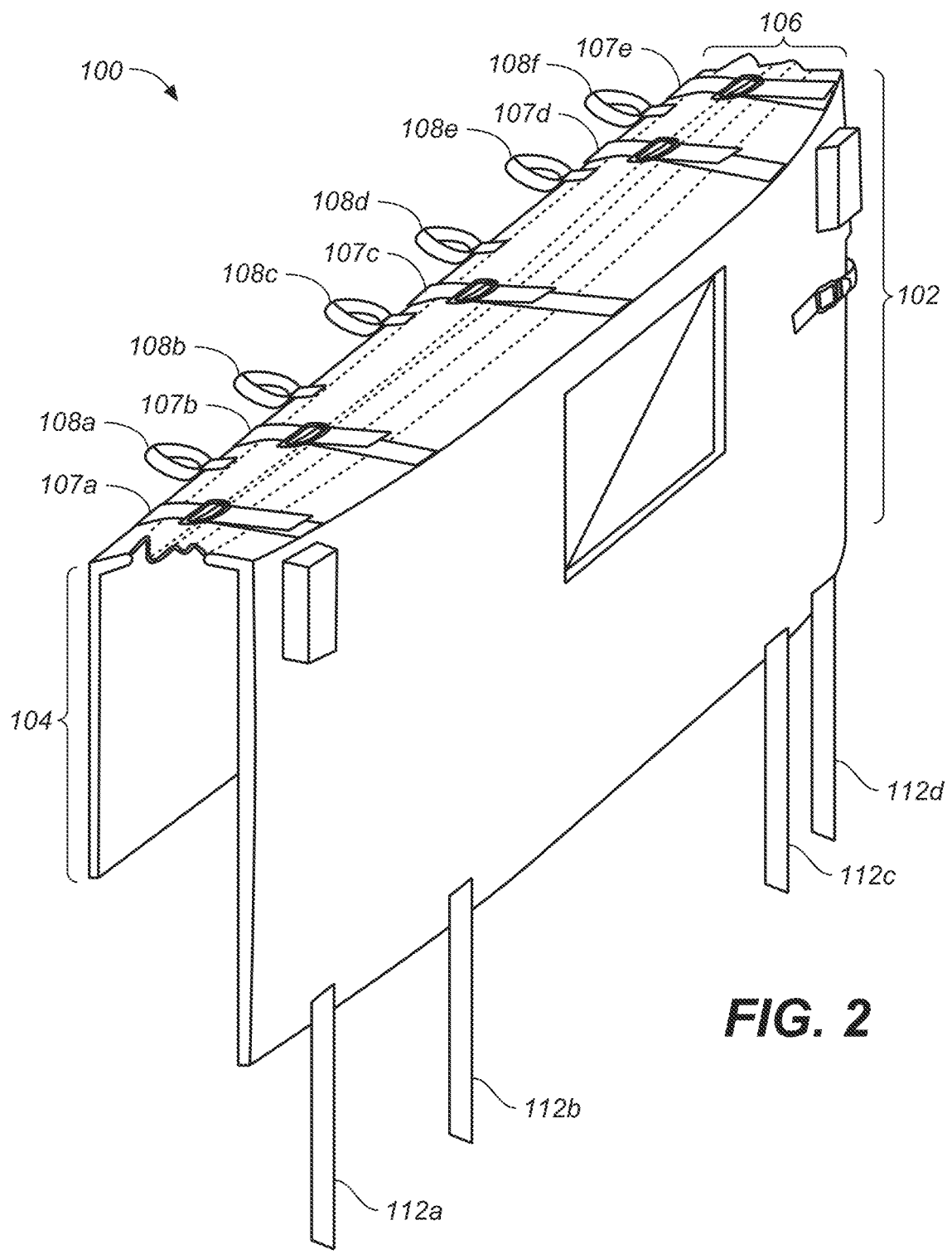
FIG. 2 is a perspective view of an adjustable tailgate pad wherein the front surface of the adjustable tailgate pad does not have a window formed therein, in accordance with embodiments of the present invention.

Referring now to FIG. 2, a perspective view of an adjustable tailgate pad 100 is shown wherein front surface 102 does not have a window (such as, e.g., window 110 of FIG. 1) formed therein, in accordance with embodiments of the present invention.

With reference again to FIG. 1, adjustable tailgate pad 100 also includes a plurality of front side straps, typically shown as 112a-112d, coupled thereto. Although four front side straps 112a-112d are shown in the embodiment of FIG. 1, in some embodiments of the present invention, adjustable tailgate pad 100 will have more than four front side straps. Further, in some embodiments of the present invention, adjustable tailgate pad 100 will have less than four front side straps. Additionally, in some embodiments, the location and/or the spacing between the plurality of front side straps 112a-112d coupled to front side 102 will differ from the location and/or spacing of front side straps 112a-112d as depicted in FIG. 1.

Referring still to FIG. 1, in various embodiments, front side straps 112a-112d are used to secure adjustable tailgate pad 100 to a tailgate. In one such embodiment, front side straps 112a-112d are placed under the bottom portion of a tailgate and are then coupled with a strap receiving feature, not numbered in FIG. 1, located on back side 104 of adjustable tailgate pad 100. One example of a strap receiving feature may include, but is not limited, a cinch ring, a back side strap, a portion of a hook-and-loop fastener to mate with corresponding portion of a hook-and-loop fastener on a front side strap, etc.

Although not shown in FIG. 1, in some embodiments of the present invention, back side 104 of adjustable tailgate pad 100 will have back side straps coupled thereto. In one such embodiment, the back side straps are placed under the bottom portion of a tailgate and are then coupled with a strap receiving feature, not numbered in FIG. 1, located on front side 102 of adjustable tailgate pad 100. In various embodiments of the present invention, back side straps are used to secure adjustable tailgate pad 100 to a tailgate in a manner as was described above with respect to front side straps 112a-112d. It should be noted that in various embodiments of the present invention, a combination of front side straps and back side straps are used to secure adjustable tailgate pad 100 to a tailgate.

Figure 3:
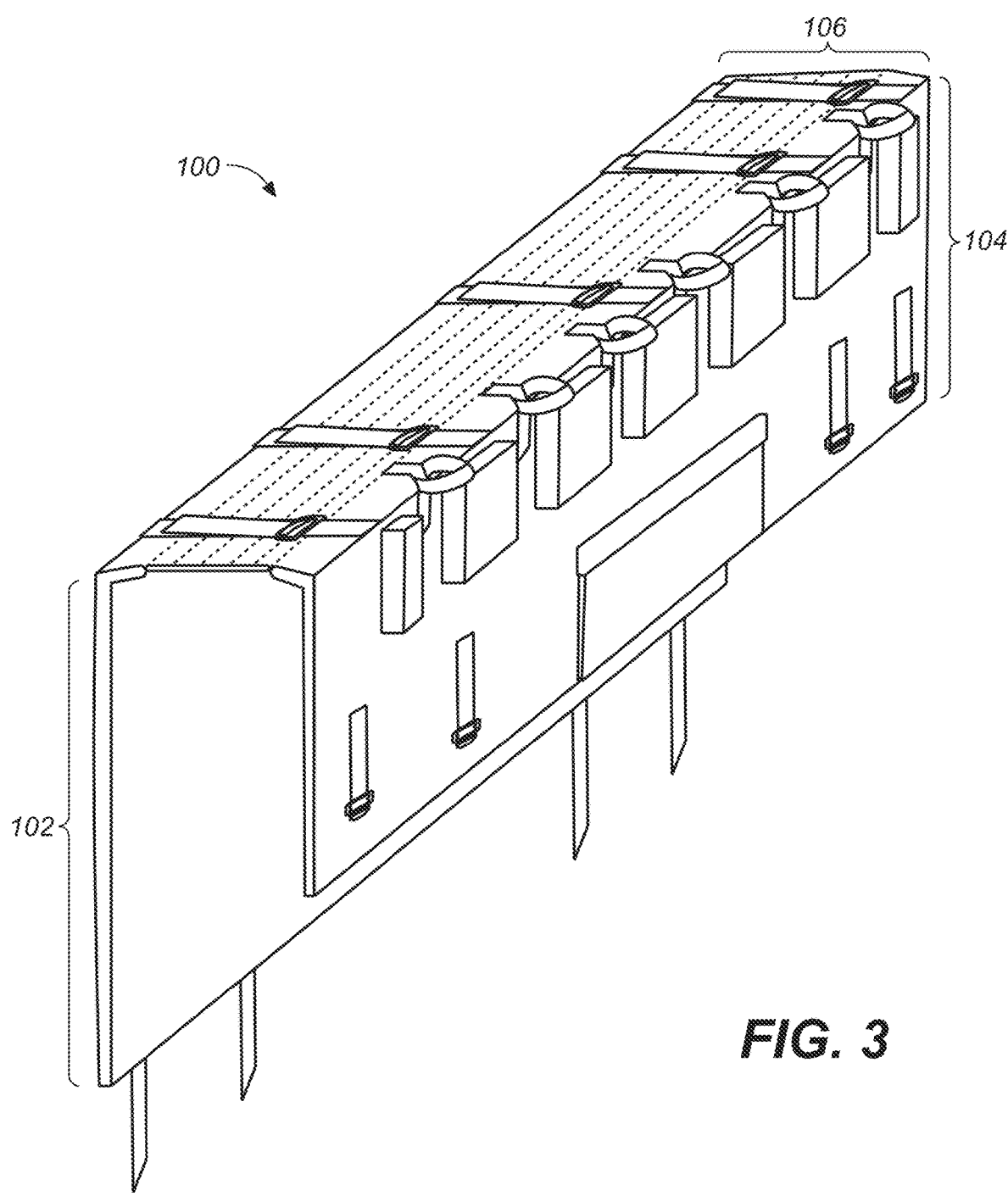
FIG. 3 is a perspective view of an adjustable tailgate pad (facing the back side thereof), in accordance with embodiments of the present invention.

Referring now to FIG. 3, a perspective view of adjustable tailgate pad 100 (facing back side 104) is shown, in accordance with embodiments of the present invention. As shown in FIG. 3, in embodiments of the present invention, adjustable tailgate pad 100 has a plurality of retaining blocks, typically shown as 302a-302g, coupled thereto. In various embodiments of the present invention, retaining blocks 302a-302g are disposed on the exterior-facing surface of back side 104 of adjustable tailgate pad 100. In various embodiments of the present invention, retaining blocks 302a-302g are used to retain and/or support a portion of a bicycle (e.g., by inserting a frame of a bicycle between two adjacent retaining blocks) in a desired position with respect to adjustable tailgate pad 100. In various embodiments of the present invention, retaining blocks 302a-302g of adjustable tailgate pad 100 will retain and/or support a bicycle in an upright position. In various embodiments of the present invention, retaining blocks 302a-302g are used in combination with retaining straps 108a-108f to retain and/or support a bicycle in a desired position with respect to adjustable tailgate pad 100. Additionally, in some embodiments of the present invention, retaining blocks 302a-302g are used without, or in lieu of, retaining straps 108a-108f to retain and/or support a bicycle in a desired position with respect to adjustable tailgate pad 100. Furthermore, in various embodiments of the present invention, at least one of retaining straps 108a-108f includes a first feature (e.g., a hook-and-loop fastener) for removably coupling the retaining strap to adjustable tailgate pad 100 and a second feature (e.g., a hook-and-loop fastener) for coupling the retaining strap to a portion of a bicycle. In so doing, embodiments of the present adjustable tailgate pad 100 enable adjustment of the location at which retaining straps 108a-108f are coupled to adjustable tailgate pad 100. In various other embodiments of the present invention, at least one of retaining straps 108a-108f is permanently affixed to adjustable tailgate pad 100 to prevent loss of the retaining strap.

Referring still to FIG. 3, although seven retaining blocks 302a-302g are shown in the embodiment of FIG. 3, in some embodiments of the present invention, adjustable tailgate pad 100 will have more than seven retaining blocks. Further, in some embodiments of the present invention, adjustable tailgate pad 100 will have less than seven retaining blocks. Additionally, in some embodiments, the location and/or the spacing between the plurality of retaining blocks 302a-302g coupled to adjustable tailgate pad 100 will differ from the location and/or spacing of retaining blocks 302a-302g as depicted in FIG. 1.

Figure 4:
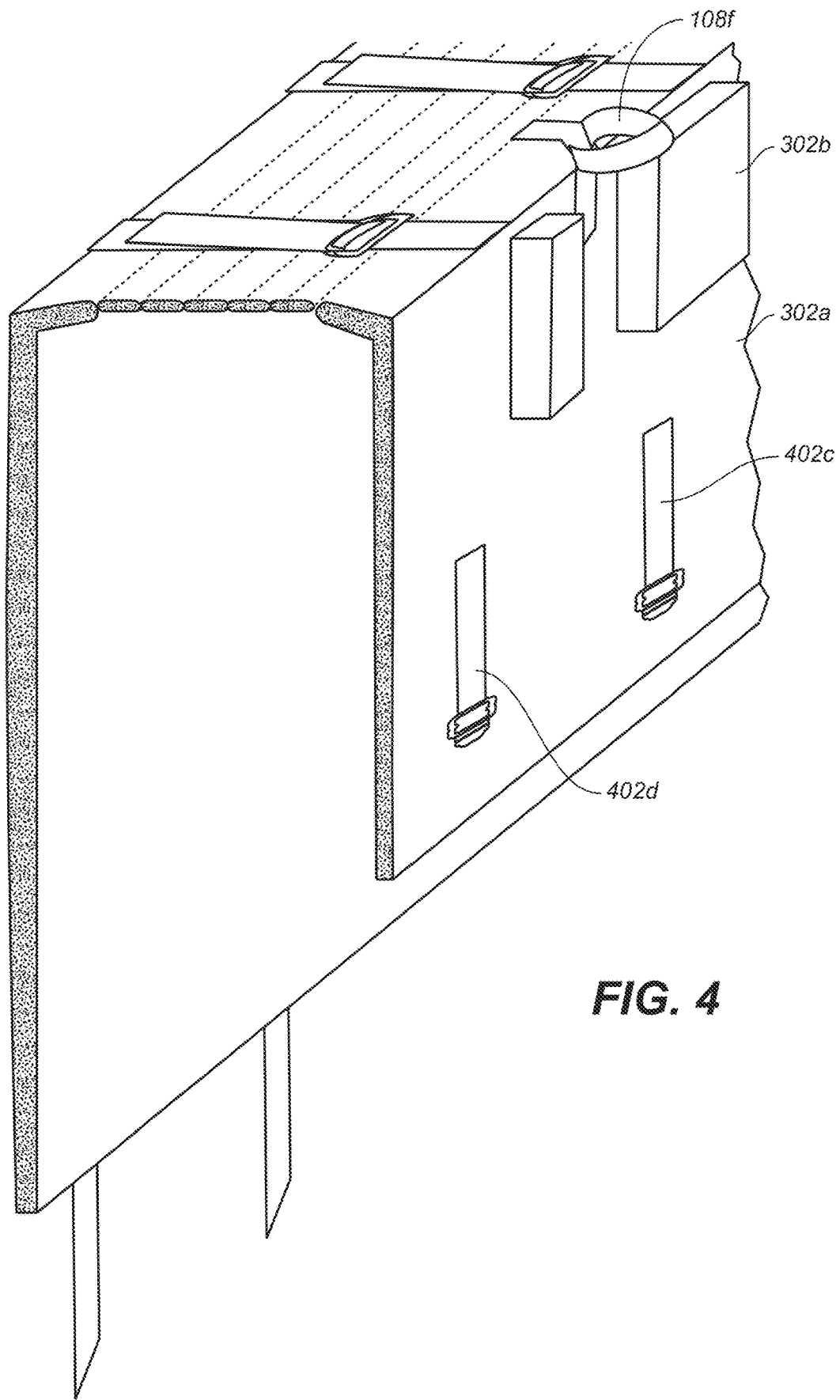
FIG. 4 is an enlarged view of a portion of FIG. 3 depicting various features of an adjustable tailgate pad, in accordance with embodiments of the present invention.

Now referring to FIG. 4, an enlarged view of a portion of FIG. 3 is provided. In FIG. 4, several features of adjustable tailgate pad 100 are further illustrated in detail. Previously described strap receiving features, typically numbered as 402a-402d, are coupled to back side 104, in accordance with embodiments of the present invention. It should be understood that as FIG. 4 depicts an enlarged view of only a portion of FIG. 3, strap receiving features 402c and 402d are shown in FIG. 4, while strap receiving features 402a and 402b are not shown in FIG. 4. Strap receiving feature 402c is positioned to receive front side strap 112c to, and strap receiving feature 402d is positioned to receive front side straps 112d. Referring to the features depicted in FIG. 4, in various embodiments of the present invention, as stated above, strap receiving feature 402c and front side strap 112c are used, together, to secure adjustable tailgate pad 100 to a tailgate. Similarly, strap receiving feature 402d and front side strap 112d are used, together, to secure adjustable tailgate pad 100 to a tailgate. Additionally, although strap receiving features 402a-402d are disposed on the exterior-facing surface of back side 104 in the embodiment depicted in FIG. 4, in various other embodiments of the present invention, strap receiving features 402a-402d are disposed on the tailgate-facing surface of back side 104.

Referring still to FIG. 4, several other features of adjustable tailgate pad 100 are further illustrated in detail. Previously described retaining blocks, typically numbered as 302a-302g, are coupled to back side 104, in accordance with embodiments of the present invention. It should once more be understood that as FIG. 4 depicts an enlarged view of only a portion of FIG. 3, retaining blocks 302a-302b are shown in FIG. 4, while retaining blocks 302c-302g are not shown in FIG. 4. Similarly, retaining strap 108f is shown in FIG. 4, while retaining straps 108a-108e are not shown in FIG. 4. In various embodiments of the present invention, in a manner as was described above, retaining strap 108f and retaining blocks 302a and 302b are used, in combination, to retain and/or support a bicycle in an upright position. In various embodiments of the present invention retaining blocks 302a and 302b are used without, or in lieu of, retaining strap 108f to retain and/or support a bicycle in a desired position with respect to adjustable tailgate pad 100.

With reference still to FIG. 4, in various embodiments, adjustable tailgate pad 100 includes padding or other features, shown as 404 in FIG. 4, disposed between the exterior-facing surface and the tailgate-facing surface of front side 102. Similarly, in various embodiments, adjustable tailgate pad 100 includes padding or other features, disposed between the exterior-facing surface and the tailgate-facing surface of back side 104. Also, in various embodiments, adjustable tailgate pad 100 includes padding or other features, disposed between the exterior-facing surface and the tailgate-facing surface of top side 106. In various embodiments of the present invention, padding or other features may be disposed between the exterior-facing surface and the tailgate-facing surface of each, none or some combination of front side 102, back side 104 and top side 106. In one embodiment of the present adjustable tailgate pad 100, feature 404 is padding. In another embodiment of the present adjustable tailgate pad 100, feature 404 is comprised of multiple layers of padding. In such embodiments, the padding helps to prevent damage to the tailgate and/or the bicycle by enabling adjustable tailgate pad 100 to provide further cushioning between surfaces of the tailgate and the bicycle.

Referring again to FIG. 4, in various embodiments of the present adjustable tailgate pad 100, a lining, shown as 406, is disposed on at least some portion of the tailgate-facing surface of front side 102 and at least some portion of the tailgate-facing surface of back side 104. Also, in various embodiments, adjustable tailgate pad 100 includes a lining disposed on at least some portion of the tailgate-facing surface of top side 106. In various embodiments of the present invention, a lining may be disposed on the tailgate-facing surface of each, none or some combination of front side 102, back side 104 and top side 106. In such embodiments, the lining provides a desired interface between the tailgate and the one or more tailgate-facing surfaces of adjustable tailgate pad 100. In various embodiments, such a lining provides, for example, one or more of a scratch reducing interface, a gripping or adhering interface, a low friction interface, etc., between the tailgate and the one or more tailgate-facing surfaces of adjustable tailgate pad 100. Further, in various embodiments, lining 406 provides cushioning between adjustable tailgate pad 100 and the tailgate to further prevent damage to the tailgate and/or the bicycle by, for example, enhancing cushioning between surfaces of the tailgate and adjustable tailgate pad 100 and/or between the tailgate and a bicycle.

Further, in various embodiments of the present invention, a lining is disposed on the exterior-facing surface of each, none or some combination of front side 102, back side 104 and top side 106. In such embodiments, the lining provides a desired interface between adjustable tailgate pad 100 and a bicycle. In various embodiments, such a lining provides, for example, one or more of a scratch reducing interface, a gripping or adhering interface, a low friction interface, etc., between adjustable tailgate pad 100 and the surface of a bicycle. Further, in various embodiments, lining 406 provides cushioning between adjustable tailgate pad 100 and a bicycle to further prevent damage to the bicycle by, for example, enhancing cushioning between surfaces of adjustable tailgate pad 100 and a bicycle, and/or between the tailgate and the bicycle.

In one embodiment of the present adjustable tailgate pad 100, feature 104 is comprised of padding. In another embodiment of the present adjustable tailgate pad 100, feature 104 is comprised of multiple layers of padding. In such embodiments, the padding helps to prevent damage to the tailgate and/or the bicycle by configuring adjustable tailgate pad 100 to provide further cushioning between surfaces of the tailgate and the bicycle.

Referring again to FIG. 4, in various embodiments of the present adjustable tailgate pad 100, previously described plurality of top side straps (shown as 107a-107e in FIGS. 1-3) are coupled to top side 106. Once again, it should be understood that as FIG. 4 depicts an enlarged view of only a portion of FIG. 3, top side straps 107d-107e are shown in FIG. 4, while top side straps 107d-107e (of, e.g., FIG. 1) are not shown in FIG. 4.

With reference still to FIG. 4, in embodiments of the present adjustable tailgate pad 100, top side straps 107d-107e (and top side straps 107a-107c) are used to adjust the width of top side 106. For purposes of the present discussion, the width of top side 106 refers to the distance, along top side 106, between front side 102 and back side 104. Additionally, for purposes of the present discussion, the length of top side 106 refers to the distance from an edge of adjustable tailgate pad 100 nearest, for example, retaining strap 108a to an opposite edge of adjustable tailgate pad 100 nearest, for example, retaining strap 108f. As will be discussed below, in embodiments of the present invention, the width of top side 106 will vary across the length of adjustable tailgate pad 100. Thus, in embodiments of the present invention, the width of top side 106 will vary from an edge of adjustable tailgate pad 100 nearest, for example, retaining strap 108a to an opposite edge of adjustable tailgate pad 100 nearest, for example, retaining strap 108f.

Additionally, although top side straps 107a-107e are disposed on the exterior-facing surface of top side 106 in the embodiment depicted in FIG. 4, in various other embodiments of the present invention, top side straps 107a-107e are disposed on the tailgate-facing surface of top side 106. In various embodiments of the present invention, top side straps are used to, for example, provide a cinching of top side 106 and, thereby, reduce the width of top side 106.

Figure 5C:
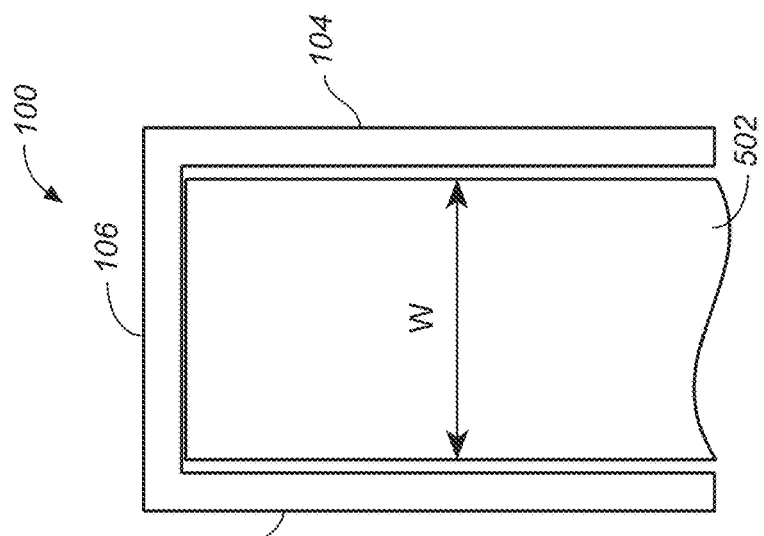
FIGS. 5A, 5B and 5C are schematic representations of a tailgate and an adjustable tailgate pad, wherein the width of a top side of the adjustable tailgate pad is adjusted to fit the width of the tailgate, in accordance with embodiments of the present invention.
Figure 5B:
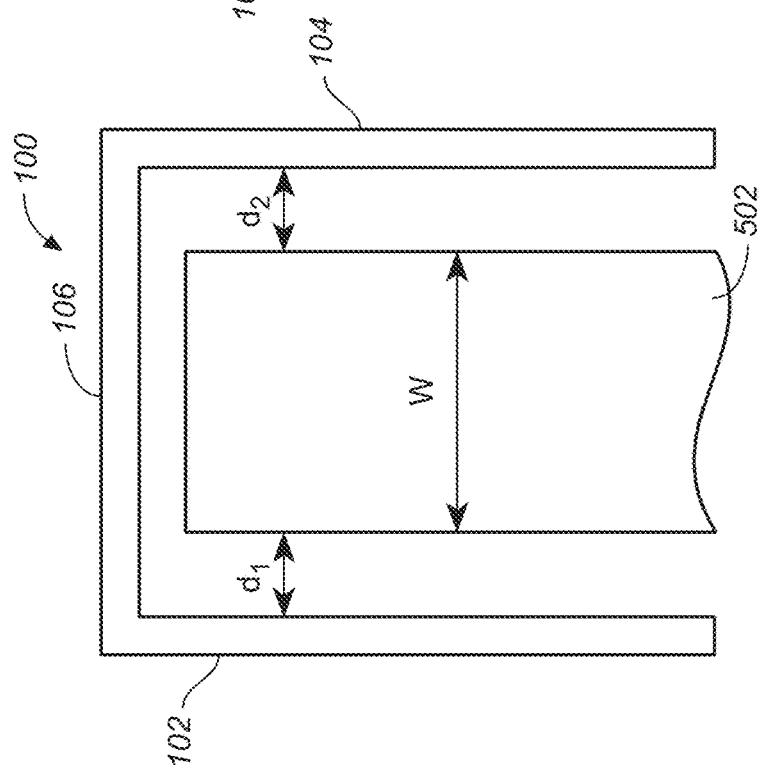
Figure 5A:
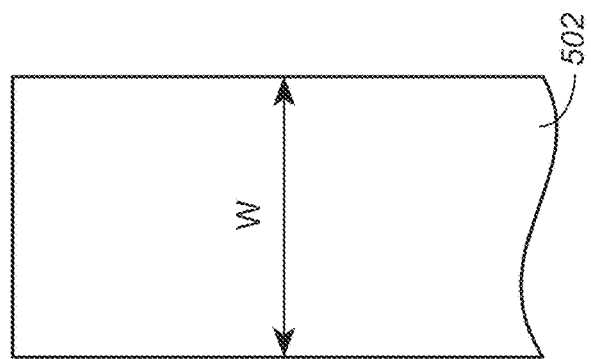

FIGS. 5A, 5B and 5C provide a schematic representation of a tailgate 502 and adjustable tailgate pad 100 wherein the width of top side 106 is adjusted to fit the width of tailgate 502. As shown in FIG. 5A, a schematic side view of a portion of tailgate 502 is shown. Tailgate 502 is shown to have a width, W. In FIG. 5B, a schematic side view of adjustable tailgate pad 100 is shown with adjustable tailgate pad disposed over tailgate 502. As depicted in FIG. 5B, top side 106 has an initial width which exceeds the width, W, of tailgate 502. More specifically, in FIG. 5B, the initial width of top side 106 exceeds the width, W, of tailgate 502 such that front side 102 is spaced from tailgate 502 by a distance $d_1$. Also, in FIG. 5B, the initial width of top side 106 exceeds the width, W, of tailgate 502 such that back side 104 is spaced from tailgate 502 by a distance $d_2$. At FIG. 5C, in accordance with embodiments of the present invention, the width of top side 106 is adjusted to fit the width, W, of tailgate 502. In one embodiment, the width of top side 106 is adjusted by using top side straps 107a-107e to cinch top side 106 and, thereby, reduce the width of top side 106 until the width of top side 106 fits the width, W, of tailgate 502. That is, the width of top side 106 is reduced (by cinching top side straps 107a-107e) until the distance $d_1$ between front side 102 and tailgate 502 is sufficiently reduced (or entirely eliminated), and/or the distance $d_2$ between back side 104 and tailgate 502 is sufficiently reduced (or entirely eliminated), to achieve a desired fit of adjustable tailgate pad 100 about tailgate 502.

Although FIGS. 5A-5C schematically illustrate an embodiment in which the initial width of top side 106 is reduced to fit the width of tailgate 502, embodiments of the present invention are also well suited to increasing the initial width of top side 106 to fit a particular tailgate. In one such embodiment, the width of top side 106 is adjusted/increased by loosening top side straps 107a-107e to allow top side 106 to expand and, thereby, increase the width of top side 106 until the width of top side 106 fits the width of the particular tailgate. That is, the width of top side 106 is increased (by, e.g., loosening top side straps 107a-107e) until front side 102 and back side 104 of adjustable tailgate pad 100 achieve a desired fit about the tailgate.

Figure 6:
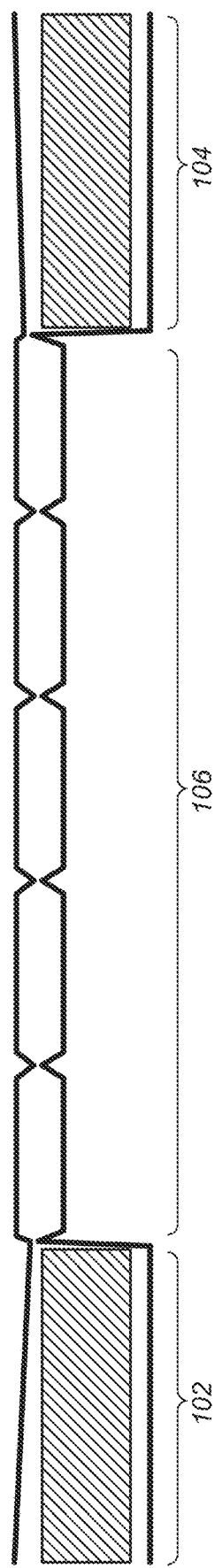
FIG. 6 is a schematic depiction of an embodiment of a structure of a top side of an adjustable tailgate pad, in accordance with embodiments of the present invention.

With reference now to FIG. 6, a schematic depiction of an embodiment of a structure of top side 106 is shown. In the embodiment of FIG. 6, top side 106 is comprised of a structure and/or a material which is capable of be compressed or expanded. Such structures and/or materials include, but are not limited to stretchable fabrics, resilient foams, honeycombed structure, elastic materials, etc.

In various embodiments of the present invention, top side 106 is comprised of a material having sufficient elasticity such that top side 106 has an "unstretched' or "relaxed" initial width which is less than the width of most tailgates. In such an embodiment, the width of top side 106 is stretched (by, e.g., sliding adjustable tailgate pad 100 over a tailgate) until front side 102 and back side 104 of adjustable tailgate pad 100 achieve a desired fit about the tailgate.

Figure 7A:
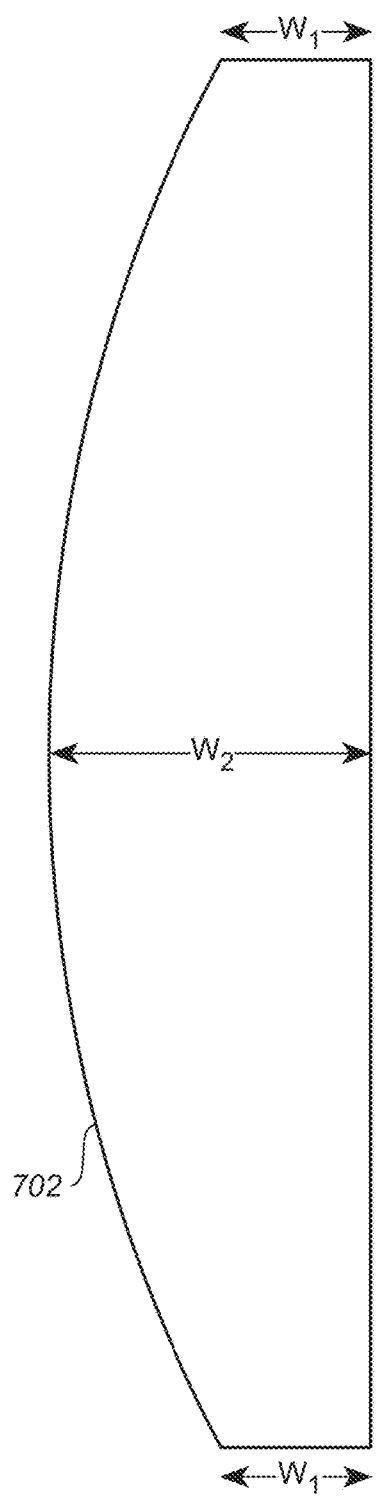
FIGS. 7A and 7B are top schematic views of a tailgate having a varying width and an adjustable tailgate pad coupled thereto, in accordance with embodiments of the present invention.
Figure 7B:
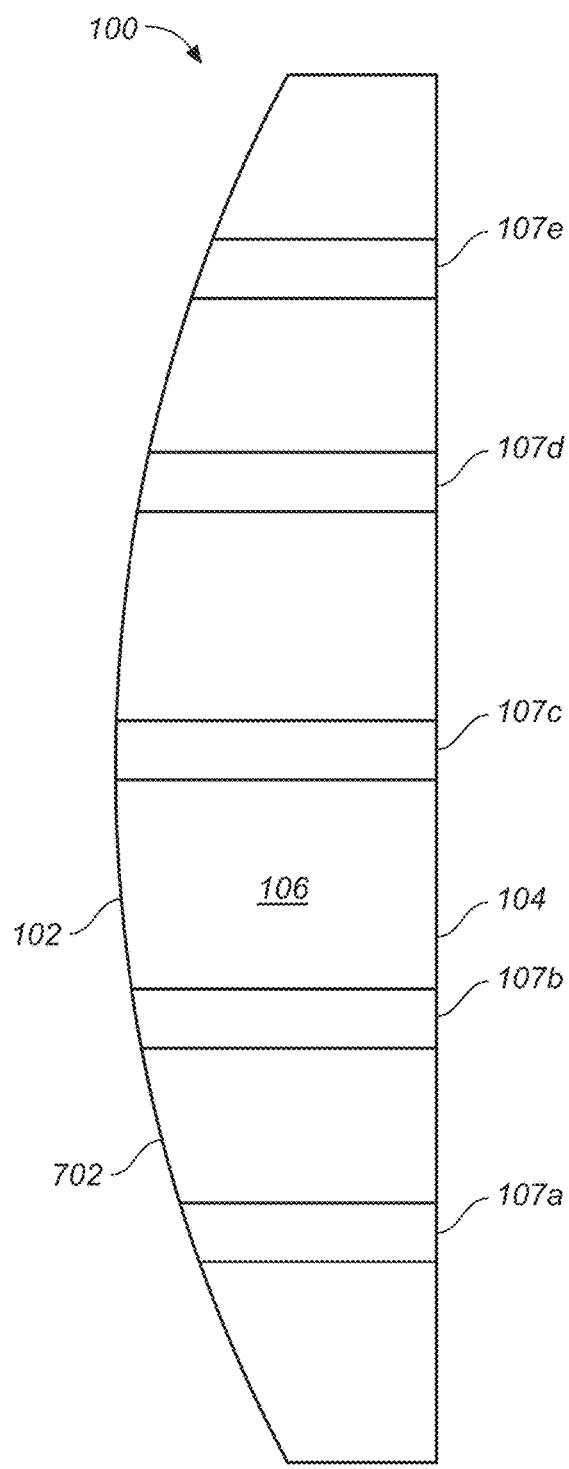

With reference now to FIGS. 7A and 7B a top schematic view of a tailgate 702 is shown. As depicted in FIG. 7A, tailgate 702 has a varying width across its length. Specifically, tailgate 702 has a width, $W_1$ at its edges, and a width, $W_2$, at or near the midpoint of its length. In various commercially available vehicles, tailgate widths vary by several inches along the length of the tailgate. That is, various commercially available vehicles have a width at the edge of the tailgate which is several inches shorter than the width at the midpoint of the length of the tailgate.

At FIG. 7B, in accordance with embodiments of the present invention, the width of top side 106 of adjustable tailgate pad 100 is adjusted to fit the varying width of tailgate 702 (i.e., from width, $W_1$ at a first edge of tailgate 702 to width, $W_2$ at the midpoint of the length of tailgate 702, and back to $W_1$, at the second edge of tailgate 702). In one embodiment, the width of top side 106 is adjusted to have a width, at or near, width W1, by using top side strap 107a to adjust the width of top side 106 until the width of top side 106 fits, at least approximately, the width, $W_1$, of tailgate 702. Additionally, in the embodiment of FIG. 7B, the width of top side 106 is adjusted to have a width which is between width $W_1$ and width $W_2$, of tailgate 702 by using top side strap 107b to adjust the width of top side 106 to the desired width.

Referring still to FIG. 7B, in the present embodiment, the width of top side 106 is adjusted to have a width, at or near, width $W_2$, by using top side strap 107c to adjust the width of top side 106 until the width of top side 106 fits, at least approximately, the width, $W_2$, of tailgate 702. Additionally, in the embodiment of FIG. 7B, the width of top side 106 is adjusted to have a width which is between width $W_1$ and width $W_2$, of tailgate 702 by using top side strap 107d to adjust the width of top side 106 to the desired width. The present embodiment further adjusts the width of top side 106 to a width, at or near, width W1, by using top side strap 107e to adjust the width of top side 106 until the width of top side 106 fits, at least approximately, the width, $W_1$, of tailgate 702. Thus, the present adjustable tailgate pad 100 is able to accommodate even a tailgate whose width varies along its length. Furthermore, the various embodiments of the present adjustable tailgate pad are able to fit about a tailgate without creating unsightly bunching or bulging of either front side 102 or back side 104. As a result, the present adjustable tailgate pad 100 is eliminates bunching and bulging of tailgate pad surfaces found in conventional ill-fitting tailgate pads. Further, by eliminating such bulging and bunching, embodiments of the present adjustable tailgate pad 100 prevent unwanted exposure of portions of the underlying tailgate. By eliminating such unwanted exposure of the tailgate, the present adjustable tailgate pad 100 also prevents unwanted scratching and/or damage to the tailgate or bicycle which can occur at the exposed portions of the tailgate.

In embodiments of the present adjustable tailgate pad 100, by adjusting the width of top surface 106, as described above, adjustable tailgate pad 100 is able to achieve a proper fit about various tailgates of different, respective, widths. As a result, a single version of the present adjustable tailgate pad 100 can be used with numerous tailgates each having a different, respective width. As a result, embodiments of the present adjustable tailgate pad 100 eliminate the requirement for a consumer to select the specific tailgate pad which is uniquely designed to match the particular tailgate width for that consumer's vehicle. Further, by providing an adjustable tailgate pad 100 which can accommodate numerous tailgate dimension and/or shapes, embodiments of the present invention reduce consumer confusion, eliminate the need for complex vehicle-to-tailgate pad matching charts, and remove the need for each tailgate to have a dedicated corresponding tailgate pad design.

Figure 8A:
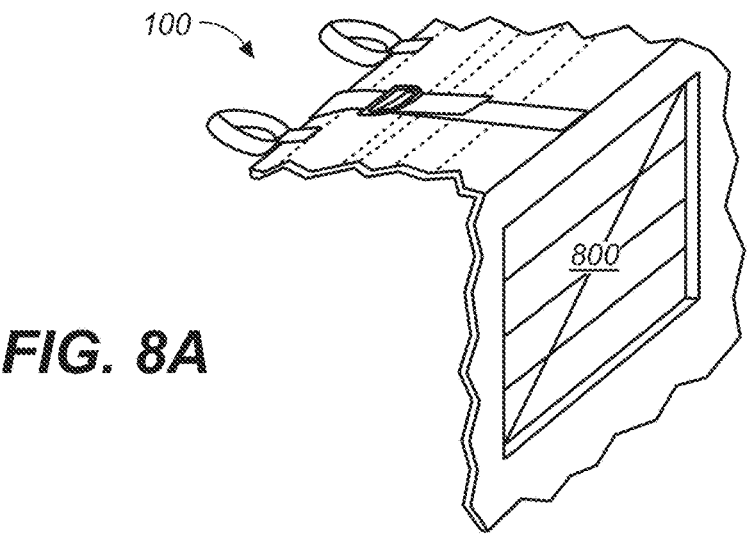
FIGS. 8A, 8B and 8C are several front perspective views of an adjustable window cover in various position with respect to a window of an adjustable tailgate pad, in accordance with embodiments of the present invention.
Figure 8B:
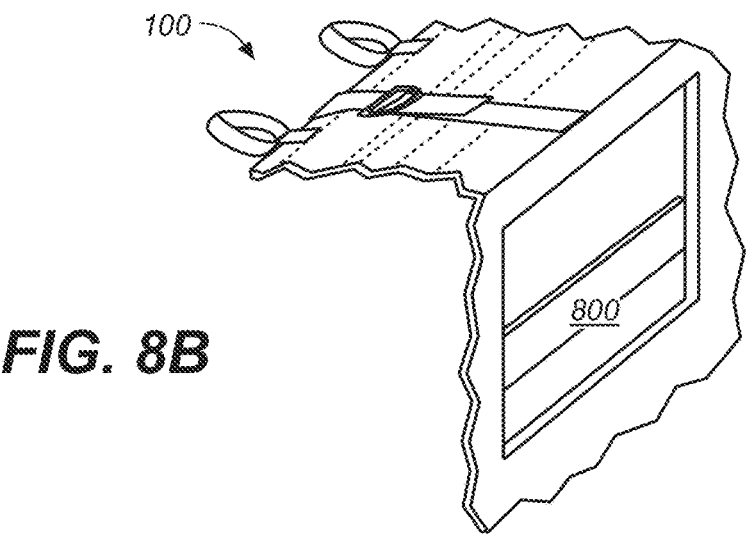
Figure 8C:
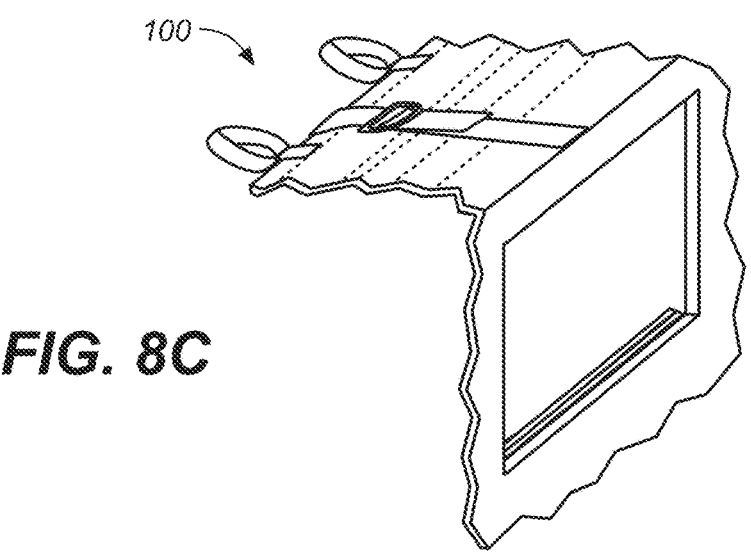

With now to FIGS. 8A, 8B and 8C, several front perspective views of an adjustable window cover 800 in various position with respect to window 110 of adjustable tailgate pad 100 is shown. In FIG. 8A, adjustable window cover 800 is shown extending across the entirety of window 110. In FIG. 8B, adjustable window cover 800 is shown partially extending across window 110. In FIG. 8C, adjustable window cover 800 is shown completely extending across window 110. As stated above, in various embodiments of the present adjustable tailgate pad 100, front side 102 has a window 110 formed therein. When window 110 of front side 102 is open (as depicted in FIG. 8A and FIG. 8B), window 110 will expose, for example, a tailgate handle, a tailgate-mounted backup camera, a retractable step, or other tailgate features.

In various embodiments of the present adjustable tailgate pad 100, adjustable window cover 800 is removably coupleable (e.g., using a hook-and-loop fastener) to adjustable tailgate pad 100 at a location near any one or more of the bottom, top, right side, or left side of window 110. Further, in various embodiments of the present adjustable tailgate pad 100, at least some portion of adjustable window cover 800 is permanently affixed to adjustable tailgate pad 100, while another portion of adjustable window cover 800 is removably coupleable to some portion of adjustable tailgate pad 100. Additionally, although adjustable window cover 800 is shown coupled to the tailgate-facing surface of front side 102 of adjustable tailgate pad 100 in FIGS. 8A-8C, in various other embodiments of the present adjustable tailgate pad 100, window cover 800 is coupled (permanently and/or removably) to the exterior-facing surface of front side 102 of adjustable tailgate pad 100.

Figure 9A:
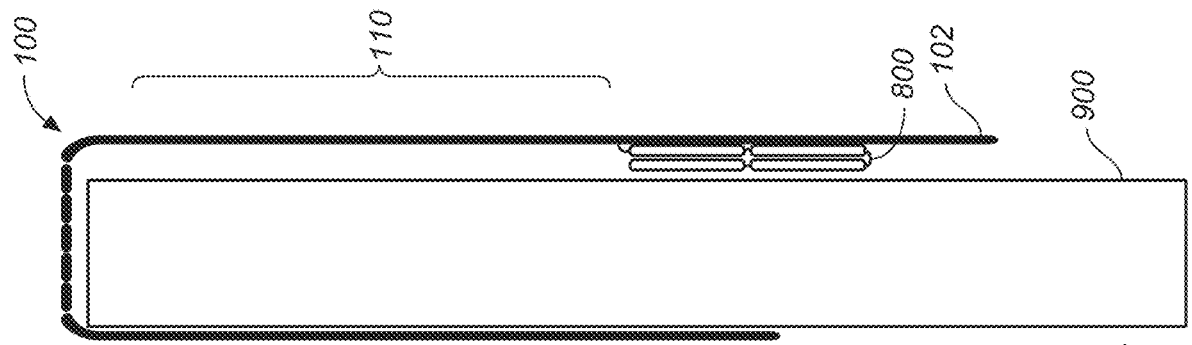
FIGS. 9A, 9B and 9C are schematic side views corresponding to FIGS. 8A, 8B and 8C, respectively, of an adjustable window cover in various position with respect to a window of an adjustable tailgate pad, in accordance with embodiments of the present invention.
Figure 9B:
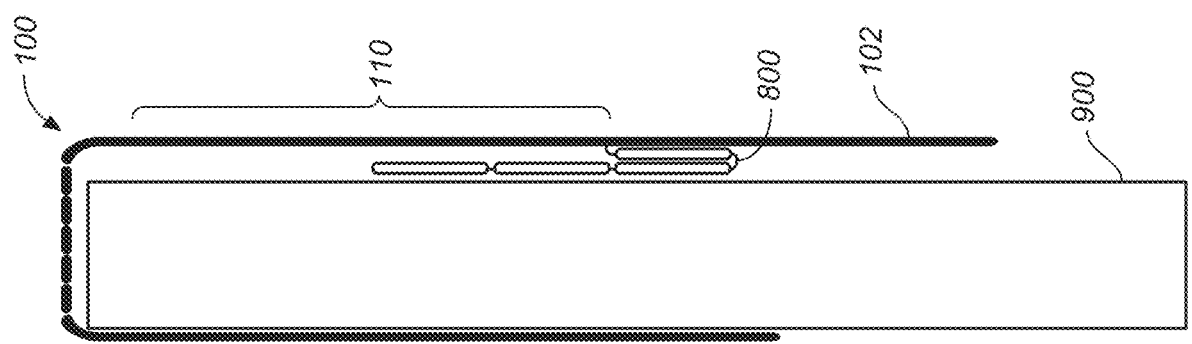
Figure 9C:
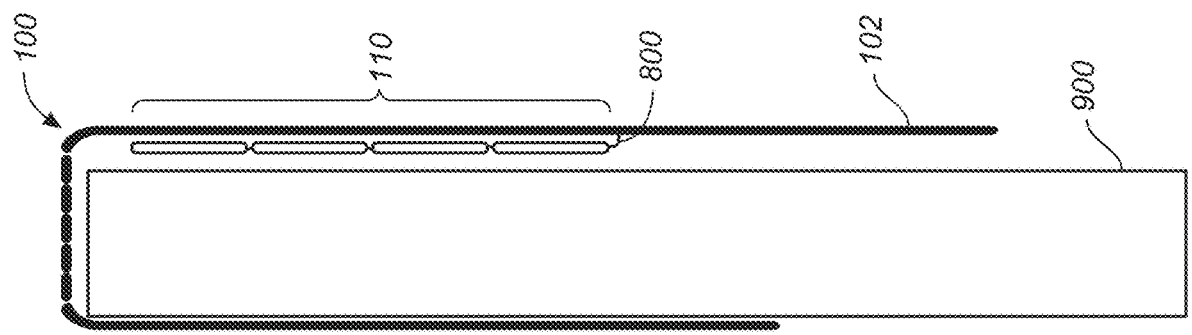

Referring now to FIGS. 9A-9C, schematic side views corresponding to FIGS. 8A-8C, respectively, are provided. As depicted in FIGS. 9A-9C, in various embodiments of the present adjustable tailgate pad 100, adjustable window cover 800 has an accordion-style structure such that at least a portion of adjustable window cover 800 is foldable into a stacked configuration. In so doing, adjustable window cover 800 can be partially or entirely disposed across window 100 to selectively expose a desired region of tailgate 900. Such selective exposure of a portion of tailgate 900 enables embodiments of the present adjustable tailgate pad 100 to have desired features of tailgate 900 exposed through window 110. Additionally, the accordion style structure of adjustable window cover 800 enables folded portions of adjustable window cover 800 to be compactly stored with respect to front side 102 of adjustable tailgate pad 100. Further, in one embodiment, adjustable window cover 800 is compactly stored between tailgate 900 front side 102 of adjustable tailgate pad 100. As a result, the present adjustable tailgate pad 100 is eliminates bunching and bulging of tailgate pad surfaces at or near window openings of conventional tailgate pads. Further, by eliminating such bulging and bunching near window openings, embodiments of the present adjustable tailgate pad 100 prevent unwanted exposure of portions of the underlying tailgate. By eliminating such unwanted exposure of the tailgate, the present adjustable tailgate pad 100 also prevents unwanted scratching and/or damage to the tailgate or bicycle which can occur at the exposed portions of the tailgate at or near window opening.

Figure 10:
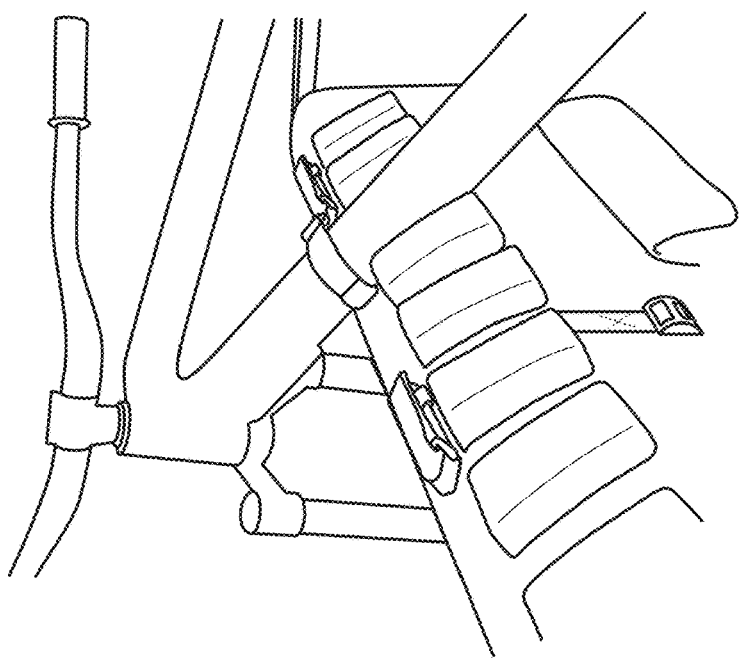
FIG. 10 is a perspective view of a tailgate pad disposed about a tailgate and a bicycle disposed about the tailgate pad, in accordance with embodiments of the present invention.
Figure 10:
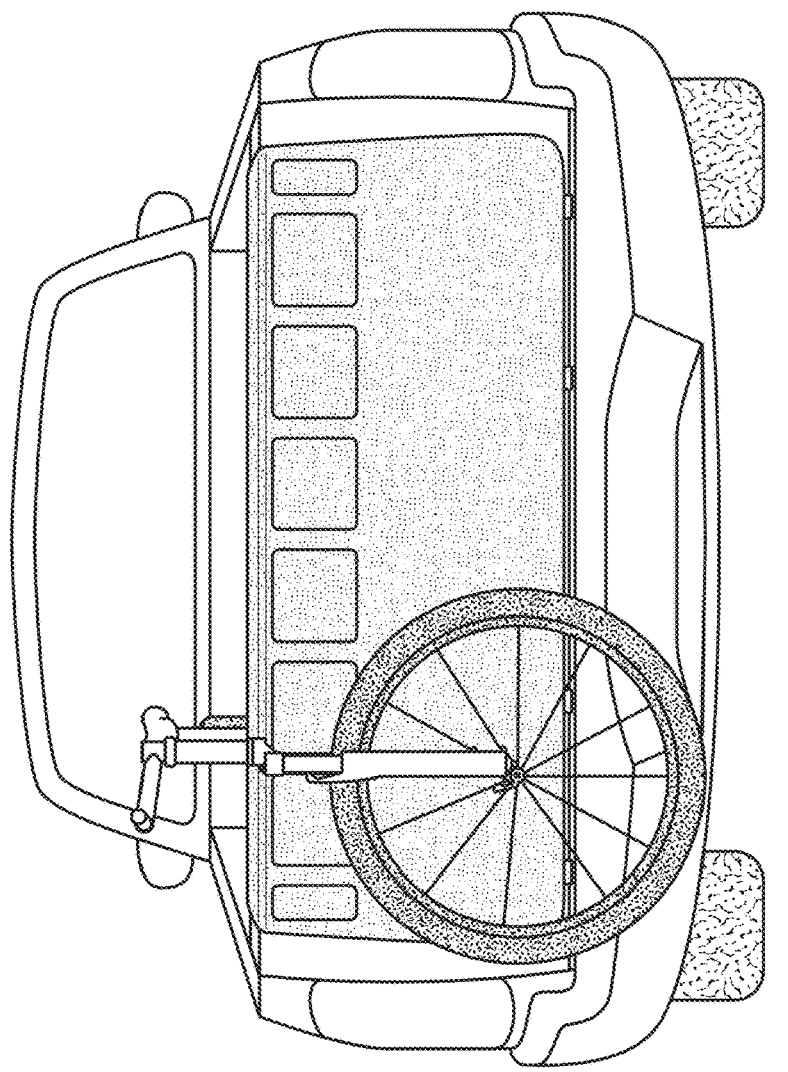

FIG. 10 is a perspective view of a tailgate pad disposed about a tailgate and a bicycle disposed about the tailgate pad.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the Claims that follow.

We claim the following:

1. An adjustable tailgate pad comprising:
   a front side;
   a back side; and
   an adjustable top side coupled to said front side and said back side, said adjustable top side having an adjustable width; and
   a plurality of top side straps coupled to said adjustable top side, said plurality of top side straps configured to adjust said adjustable width of said adjustable top side.

2. The adjustable tailgate pad of claim 1 further comprising:
   a plurality of retaining straps coupled to said adjustable tailgate pad.

3. The adjustable tailgate pad of claim 2 wherein said plurality of retaining straps are coupled to said adjustable tailgate pad at a location on said adjustable tailgate pad to enable strapping a portion of a vehicle against said back side of said adjustable tailgate pad.

4. The adjustable tailgate pad of claim 1 further comprising:
   a window formed in said front side of said adjustable tailgate pad, said window disposed to expose a tailgate feature.

5. The adjustable tailgate pad of claim 1 further comprising:
   a plurality of front side straps coupled to said front side of said adjustable tailgate pad; and
   a plurality of strap receiving features coupled to said back side of said adjustable tailgate pad, at least one of said plurality of front side straps configured to be coupled to a respective at least one of said plurality of strap receiving features to secure said adjustable tailgate pad to a tailgate.

6. The adjustable tailgate pad of claim 5 wherein said at least one of said plurality of strap receiving features is selected from the group consisting of: a cinch ring, a back side strap, and a portion of a hook-and-loop fastener to mate with a corresponding portion of a hook-and-loop fastener on a front side strap.

7. The adjustable tailgate pad of claim 1 further comprising:
a plurality of retaining blocks disposed on said back side of said adjustable tailgate pad.

8. The adjustable tailgate pad of claim 7 wherein said plurality of retaining blocks are configured to retain a portion of a vehicle between adjacent ones of said plurality of retaining blocks.

9. The adjustable tailgate pad of claim 1 further comprising:
a plurality of retaining straps coupled to said adjustable tailgate pad, said plurality of retaining straps configured to support a vehicle in a desired position with respect to said adjustable tailgate pad.

10. The adjustable tailgate pad of claim 1 further comprising:
a plurality of retaining blocks disposed on said back side of said adjustable tailgate pad; and
a plurality of retaining straps coupled to said adjustable tailgate pad, wherein said plurality of retaining straps and said plurality of retaining blocks are configured to retain a portion of a vehicle in a desired position with respect to said adjustable tailgate pad.

11. The adjustable tailgate pad of claim 1 further comprising:
padding coupled to said front side of said adjustable tailgate pad such that, when said adjustable tailgate pad is coupled to a tailgate, said padding is disposed between said front side of said adjustable tailgate pad and said tailgate, said padding having a surface selected from the group consisting of: a scratch reducing interface, a gripping interface, an adhering interface, and a low friction interface.

12. The adjustable tailgate pad of claim 1 wherein said adjustable top side is comprised of a material having sufficient elasticity such that adjustable top side has an initial width which is less than the width of a tailgate to which said adjustable tailgate pad will be coupled.

13. The adjustable tailgate pad of claim 1 wherein said adjustable top side is configured to fit about a tailgate without creating bunching of either said front side or said back side of said adjustable tailgate pad.

14. The adjustable tailgate pad of claim 1 wherein said adjustable tailgate pad is configured for use with a plurality of tailgates each having a different respective tailgate width.

15. The adjustable tailgate pad of claim 4 further comprising:
an adjustable window cover coupled to said adjustable tailgate pad, said adjustable window cover configured to extending across at least a portion of said window.

16. The adjustable tailgate pad of claim 15 wherein said adjustable window cover has an accordion-style structure such that at least a portion of said adjustable window cover is foldable into a stacked configuration.

17. The adjustable tailgate pad of claim 16 wherein said portion of said adjustable window cover folded into said stacked configuration can be compactly stored with respect to said adjustable tailgate pad to eliminate bunching of said adjustable tailgate pad near said window.

18. An adjustable tailgate pad comprising:
a front side;
a back side;
an adjustable top side coupled to said front side and said back side, said adjustable top side having a width which is adjustable;
a plurality of top side straps coupled to said adjustable top side, said plurality of top side straps configured to adjust said adjustable width of said adjustable top side;
a window formed through said front side, said window disposed to expose a tailgate feature; and
an adjustable window cover coupled to said front side, said adjustable window cover configured to selectively extend across a portion of said window.

19. The adjustable tailgate pad of claim 18 further comprising:
a plurality of retaining blocks disposed on said back side of said adjustable tailgate pad; and
a plurality of retaining straps coupled to said adjustable tailgate pad, wherein said plurality of retaining straps and said plurality of retaining blocks are configured to retain a portion of a vehicle in a desired position with respect to said adjustable tailgate pad.

\* \* \* \* \*